United States Patent
Acks et al.

(10) Patent No.: US 11,814,159 B2
(45) Date of Patent: Nov. 14, 2023

(54) NOSE WHEEL STEERING SYSTEM

(71) Applicant: GOODRICH CORPORATION, Charlotte, NC (US)

(72) Inventors: James Acks, Medina, OH (US); Korey Michael Reber, Strongsville, OH (US); Ronald Kucera, Broadview Hts., OH (US)

(73) Assignee: GOODRICH CORPORATION, Charlotte, NC (US)

( * ) Notice: Subject to any disclaimer, the term of this patent is extended or adjusted under 35 U.S.C. 154(b) by 269 days.

(21) Appl. No.: 17/154,675

(22) Filed: Jan. 21, 2021

(65) Prior Publication Data
US 2021/0245869 A1     Aug. 12, 2021

Related U.S. Application Data

(60) Provisional application No. 62/970,898, filed on Feb. 6, 2020.

(51) Int. Cl.
| | |
|---|---|
| *B64C 25/50* | (2006.01) |
| *B64C 25/22* | (2006.01) |
| *B64C 25/26* | (2006.01) |
| *F16H 19/04* | (2006.01) |

(52) U.S. Cl.
CPC .............. *B64C 25/50* (2013.01); *B64C 25/22* (2013.01); *B64C 25/26* (2013.01); *F16H 19/04* (2013.01); *B64C 25/505* (2013.01)

(58) Field of Classification Search
CPC .................................. B64C 25/22; B64C 25/50
See application file for complete search history.

(56) References Cited

U.S. PATENT DOCUMENTS

| | | | |
|---|---|---|---|
| 2,756,949 A | * | 7/1956 | Smith ................ B64C 25/50 244/50 |
| 2,988,056 A | | 6/1961 | Rumsey |
| 5,086,994 A | | 2/1992 | Donnelly et al. |
| 8,136,754 B2 | | 3/2012 | De Ruffray et al. |
| 8,986,159 B2 | | 3/2015 | Hawksworth et al. |
| 10,196,135 B2 | | 2/2019 | Quenerch'Du et al. |
| 2009/0090810 A1 | | 4/2009 | De Ruffray et al. |

FOREIGN PATENT DOCUMENTS

| | | |
|---|---|---|
| GB | 2161123 | 1/1986 |
| WO | 2014023941 | 2/2014 |

OTHER PUBLICATIONS

European Patent Office, European Search Report dated Jun. 25, 2021 in Application No. 21154910.0.

* cited by examiner

*Primary Examiner* — Philip J Bonzell
*Assistant Examiner* — Colin Zohoori
(74) *Attorney, Agent, or Firm* — SNELL & WILMER L.L.P.

(57) ABSTRACT

A nose-wheel steering system is disclosed. In various embodiments, the system includes an actuator; a strut; and a gearing mechanism operably coupling the actuator to the strut, the gearing mechanism including a steering collar attached to the strut, and idler gear engaged with the actuator and a pinion having a first gear engaged with the idler gear and a second gear engaged with the steering collar.

6 Claims, 5 Drawing Sheets

NOSE WHEEL STEERING SYSTEM

CROSS-REFERENCE TO RELATED APPLICATIONS

This application claims priority to, and the benefit of, U.S. Provisional Application No. 62/970,898, filed Feb. 6, 2020 and titled "NOSE WHEEL STEERING SYSTEM," which is herein incorporated by reference in its entirety for all purposes.

FIELD

The present disclosure relates generally to aircraft steering systems and, more particularly, to nose wheel steering systems having an offset horizontal rack.

BACKGROUND

Aircraft typically employ nose-wheel steering systems to steer the aircraft while taxiing on the ground. A typical nose-wheel steering system includes an axially translatable toothed rack, the teeth of which are engaged with the teeth of a pinion formation provided upon a strut associated with the nose-wheel. Axial movement of the rack drives the pinion, and hence the strut, for angular movement, thus adjusting the orientation of the nose-wheel to affect steering. Such an arrangement is typically of relatively large dimension and is, therefore, not easy to accommodate while stored or not otherwise in use. Also, alignment of the strut and the rack, providing adequate support for the rack, and mechanical and hydraulic balancing of an actuator coupled to the rack, can be difficult to achieve.

SUMMARY

A nose-wheel steering system is disclosed. In various embodiments, the system includes an actuator; a strut; and a gearing mechanism operably coupling the actuator to the strut, the gearing mechanism including a steering collar attached to the strut, and idler gear engaged with the actuator and a pinion having a first gear engaged with the idler gear and a second gear engaged with the steering collar.

In various embodiments, the actuator includes a rack engaged with the idler gear. In various embodiments, the actuator is a hydraulic actuator. In various embodiments, the actuator includes a first hydraulic chamber configured to translate the rack in a first direction. In various embodiments, the actuator includes a second hydraulic chamber configured to translate the rack in a second direction.

In various embodiments, the first gear has a first gear radius and the second gear has a second gear radius, the second gear radius being at least twice the first gear radius. In various embodiments, the idler gear has an idler gear radius equal to the first gear radius.

In various embodiments, the steering collar includes a toothed section and a free section. In various embodiments, the toothed section extends about a circumference of the strut equal to between ninety degrees and one-hundred twenty degrees. In various embodiments, the free section extends about a circumference of the strut equal to between two-hundred forty degrees and two-hundred seventy degrees.

In various embodiments, the actuator includes a housing that defines an integrated manifold. In various embodiments, the integrated manifold includes a hydraulic control system configured to control a flow of hydraulic fluid to a first hydraulic chamber in fluid communication with a rack engaged with the idler gear. In various embodiments, the hydraulic control system is configured to control the flow of hydraulic fluid to a second hydraulic chamber in fluid communication with the rack. In various embodiments, the hydraulic control system includes a valve configured to control the flow of hydraulic fluid to the first hydraulic chamber and to the second hydraulic chamber.

A steering system is disclosed. In various embodiments, the system includes an actuator having a housing and a rack slidably disposed within the housing; a strut having a steering collar disposed about at least a toothed section of a circumference of the strut; and a gearing mechanism operably coupling the rack to the steering collar, the gearing mechanism including an idler gear engaged with the rack and a pinion having a first gear engaged with the idler gear and a second gear engaged with the steering collar.

In various embodiments, the actuator includes a first hydraulic chamber configured to translate the rack in a first direction and a second hydraulic chamber configured to translate the rack in a second direction. In various embodiments, the first gear has a first gear radius and the second gear has a second gear radius, the second gear radius being at least twice the first gear radius.

In various embodiments, the steering collar includes the toothed section and a free section and the toothed section extends about the circumference of the strut equal to between ninety degrees and one-hundred twenty degrees and the free section extends about the circumference of the strut equal to between two-hundred forty degrees and two-hundred seventy degrees. In various embodiments, the actuator includes a valve disposed within an integrated manifold that is configured to control a flow of hydraulic fluid to the first hydraulic chamber and to the second hydraulic chamber. In various embodiments, the housing includes a detent configured to lock the rack.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
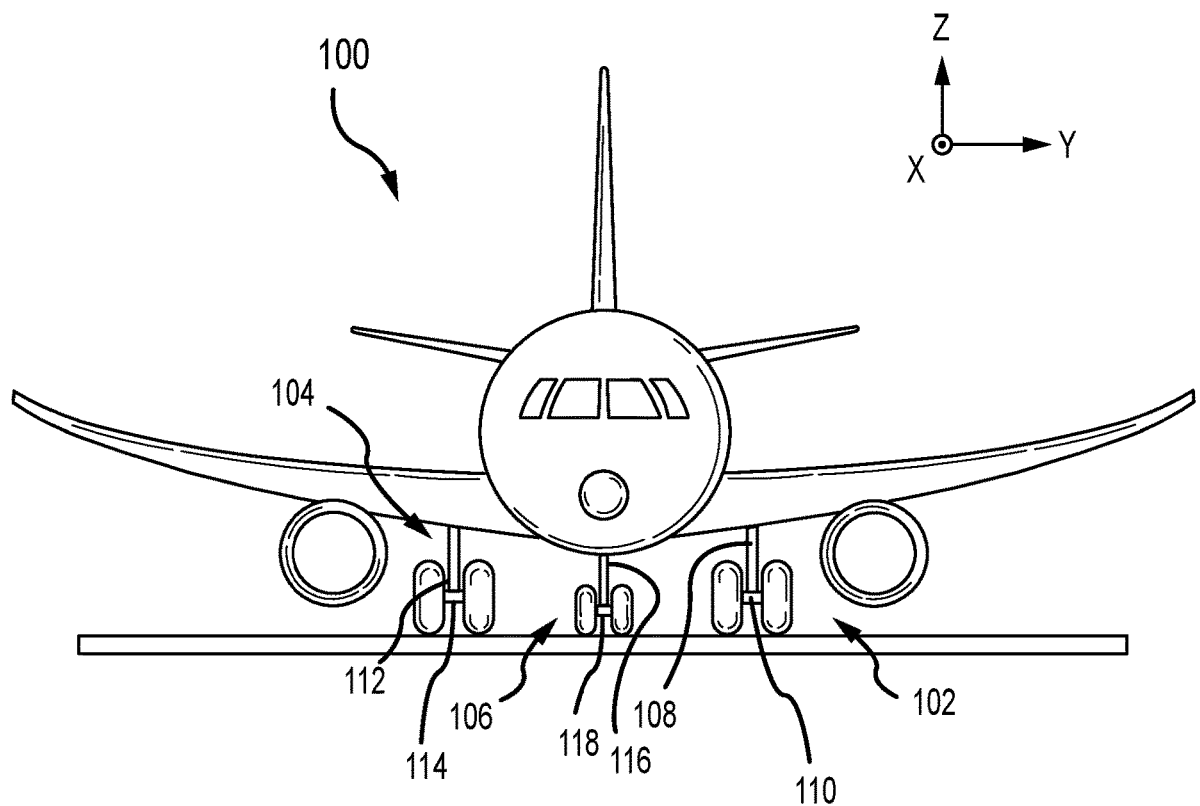
FIG. 1 illustrates an aircraft having left, right and nose landing gear assemblies and wheels mounted thereon, in accordance with various embodiments.

With reference to FIG. 1, an aircraft 100 is illustrated. In accordance with various embodiments, the aircraft 100 may include one or more landing gear assemblies, such as, for example, a left landing gear assembly 102 (or port-side landing gear assembly), a right landing gear assembly 104 (or starboard-side landing gear assembly) and a nose landing gear system 106. Each of the left landing gear assembly 102, the right landing gear assembly 104 and the nose landing gear system 106 may support the aircraft 100 when not flying, allowing the aircraft 100 to taxi, takeoff and land, safely and without damage to the aircraft. In various embodiments, the left landing gear assembly 102 may include a left shock strut assembly 108 and a left wheel assembly 110, the right landing gear assembly 104 may include a right shock strut assembly 112 and a right wheel assembly 114 and the nose landing gear system 106 may include a nose shock strut assembly 116 and a nose wheel assembly 118.

Figure 2:
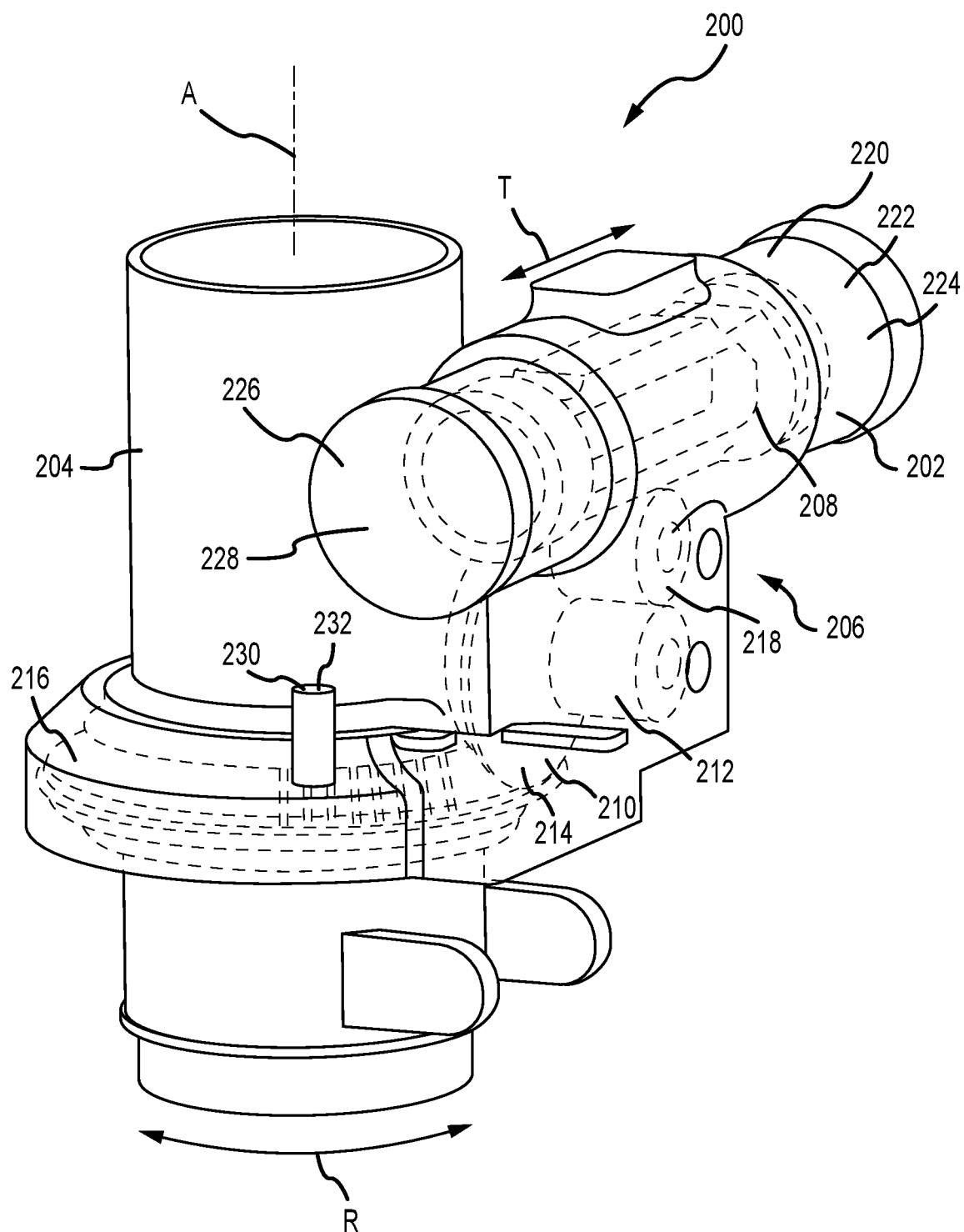
FIG. 2 illustrates various mechanical components of a nose landing gear system, in accordance with various embodiments.

Referring now to FIG. 2, a nose-wheel steering system 200 (or a steering system) is illustrated. The nose-wheel steering system 200 includes an actuator 202 operably coupled to a strut 204. In various embodiments, the actuator 202 is operably coupled to the strut via a gearing mechanism 206. In various embodiments, the gearing mechanism 206 is a rack and pinion type mechanism that converts translational movement of a rack 208 in a translational direction (T) to rotary movement of the strut 204 in a rotational direction (R) via a pinion 210. The pinion 210 includes a first gear 212 connected to a second gear 214, which typically has a larger radius that that of the first gear 212. In various embodiments, the second gear 214 is a bevel gear configured to engage a steering collar 216 that is itself coupled to the strut 204. Positioned between the first gear 212 and the rack 208 is an idler gear 218, which facilitates positioning of the rack 208 at a location higher up the strut 204 and further away from the steering collar 216 than is otherwise possible.

As mentioned above, in various embodiments, the first gear 212 has a radius that is smaller than a radius of the second gear 214. The smaller radius of the first gear 212 provides at least two advantages. First, the smaller radius of the first gear 212 provides a mechanical advantage, in that a relatively small angular motion of the first gear 212 provides a relatively large angular motion of the second gear 214, with the two angular motions being related by the ratio of the two radii ($R_2/R_1$), where $R_1$ (a first gear radius) is the radius of the first gear 212 and $R_2$ (a second gear radius) is the radius of the second gear 214. Second, the smaller radius of the first gear 212 enables a length of the rack 208 to be shortened when compared to an embodiment where a rack is configured to directly engage a steering collar without intermediate gearing. Thus, in the limit of vanishingly small $R_1$, the length of the rack 208 also becomes vanishingly small, leading to a more compact actuator. In various embodiments, the ratio of the two radii ($R_2/R_1$) is within a range of about one (1) to about five (5); and in various embodiments, the ratio is within a range of about one (1) to about three (3); and in various embodiments, is equal to about two (2). In various embodiments, a radius of the idler gear 218 ($R_I$, or an idler gear radius) is about equal to that of the first gear 212, though, in various embodiments $R_I/R_1>1$, which provides yet another mechanical advantage leading to a shorter length of the rack 208. In various embodiments, the ratio of $R_I/R_1$ is within a range of about one (1) to about three (3), and in various embodiments, the ratio is equal to about two (2). In various embodiments, a radius of the steering collar 216 ($R_S$, or a steering collar gear radius) is about equal to that of the second gear 214, though, in various embodiments $R_S/R_2>1$, which provides yet another mechanical advantage. In various embodiments, for example, the ratio of $R_S/R_2$ is within a range of about one (1) to about three (3), and in various embodiments, the ratio is equal to about two (2).

Still referring to FIG. 2, in various embodiments, the actuator 202 is a hydraulic actuator configured to translate the rack 208 within a housing 220. The housing 220 provides for a first hydraulic chamber 222 positioned on a left side 224 (or a port side) of the housing 220 a second hydraulic chamber 226 positioned on a right side 228 (or a starboard side) of the housing 220. In operation, the first hydraulic chamber 222 is pressurized with hydraulic fluid, which forces the rack 208 to translate from the left side 224 toward the right side 228. Translation of the rack 208 (e.g., in the translational direction (T)), which has gear teeth configured to engage gear teeth on the idler gear 218, causes the idler gear 218 to rotate in a first direction (e.g., a clockwise direction with respect to an axis perpendicular to an axis A that extends through the strut 204). Rotation of the idler gear 218 in the first direction causes the first gear 212 and the second gear 214 to rotate in a second direction (e.g., a counter-clockwise direction with respect to an axis perpendicular to the axis A that extends through the strut 204). Rotation of the second gear 214, which has gear teeth configured to engage gear teeth on the steering collar 216, causes the steering collar 216 to also rotate in a first direction (e.g., a clockwise direction with respect to the axis A through the strut 204). Rotation of the steering collar 216 in the first direction (e.g., in the rotational direction (R)) causes the strut 204 to likewise rotate in the first direction, thereby enabling the aircraft to turn, for example toward its left or port side. The process is reversed to enable turning the aircraft to the right or starboard side. That is, the first hydraulic chamber 222 is depressurized while the second hydraulic chamber 226 is pressurized with hydraulic fluid, which forces the rack 208 to translate from the right side 228 toward the left side 224, thereby causing the various gear elements described above to rotate in the opposite directions.

In various embodiments, the nose-wheel steering system 200 further includes a position sensor 230 such as, for example, a rotary variable differential transformer 232 that is coupled to the steering collar 216. The position sensor 230 is configured to facilitate use of a steering collar that includes both a toothed section and a free section—i.e., the steering collar 216 does not include gear teeth disposed about the entire circumference of the strut 204. In various embodiments, for example, the steering collar 216 is configured for turning by the actuator 202 up to forty-five degrees (45°) in either direction (e.g., in the left or right directions). In such configuration, the steering collar 216 includes gear teeth disposed about an angular segment equal to ninety degrees (90°), with the other two-hundred seventy degrees (270°) having no gear teeth, which provides a weight saving measure. In various embodiments, the toothed section may extend about one-hundred twenty degrees (120°) about the circumference of the strut 204 and the free section may extend about two-hundred forty degrees (240°) about the circumference of the strut 204. If the strut 204 is turned beyond the limit of the gear teeth in either direction, the second gear 214 of the pinion 210 no longer engages with the gear teeth of the steering collar 216. This enables manual turning of the strut 204 for tight turning or maneuvering of the aircraft by, for example, a tug or some other motive device. However, in the case where the actuator 202 or, more specifically, the rack 208 has moved while the pinion 210 is not engaged with the gear teeth of the steering collar 216, a precise measurement of the respective locations of the rack 208 and the steering collar 216 must be maintained in order to properly reengage the pinion 210 and the steering collar. The precise measurement is provided by the position sensor 230.

Figure 3A:
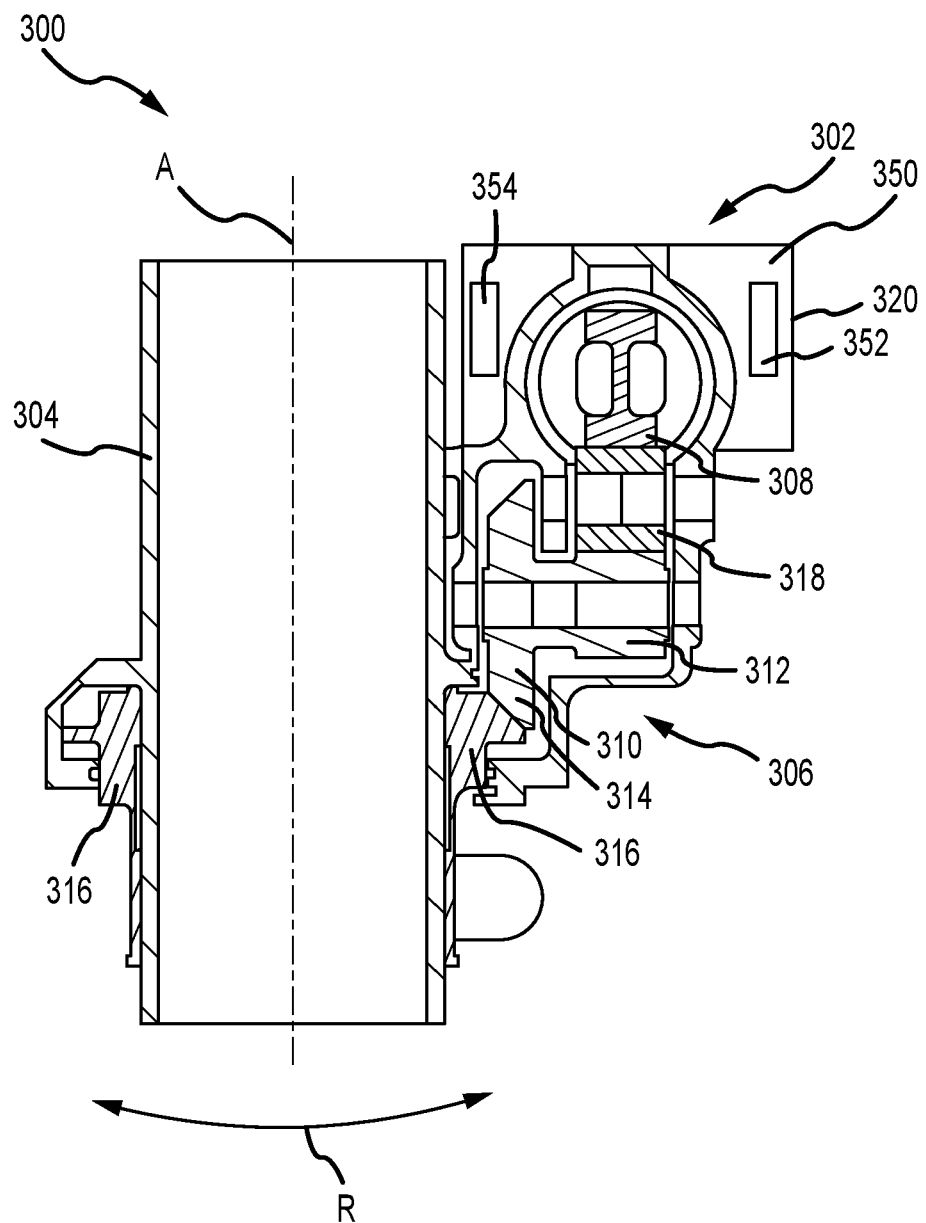
FIGS. 3A and 3B provide side and overhead views that illustrate various mechanical components of a nose landing gear system, in accordance with various embodiments.
Figure 3B:
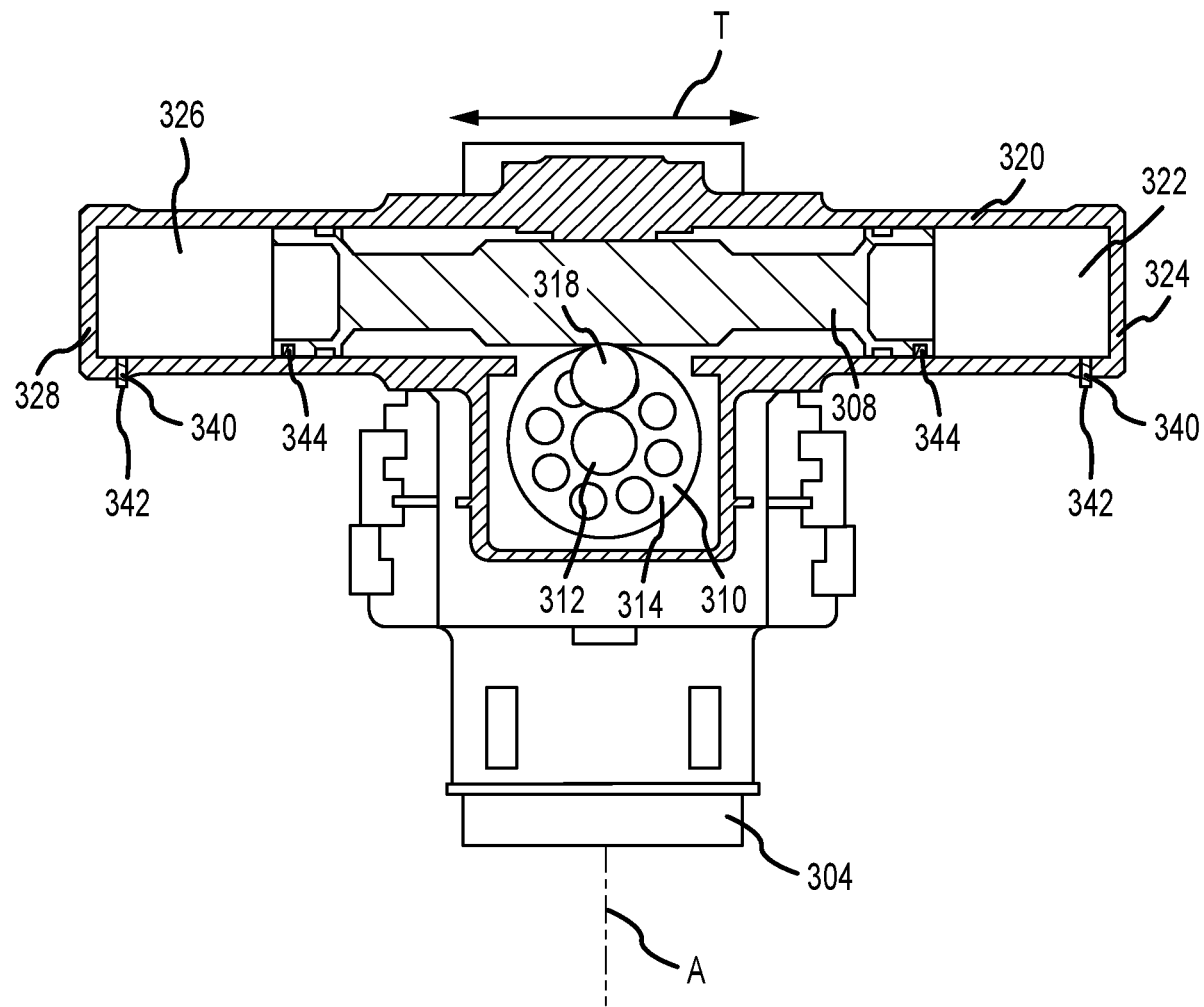

Referring now to FIGS. 3A and 3B, a nose-wheel steering system 300, similar to the nose-wheel steering system 200 described above with reference to FIG. 2, is illustrated. The nose-wheel steering system 300 includes an actuator 302 operably coupled to a strut 304. In various embodiments, the actuator 302 is operably coupled to the strut via a gearing mechanism 306. In various embodiments, the gearing mechanism 306 is a rack and pinion type mechanism that converts translational movement of a rack 308 in a translational direction (T) to rotary movement of the strut 304 in a rotational direction (R) via a pinion 310. The pinion 310 includes a first gear 312 connected to a second gear 314, which typically has a larger radius that that of the first gear 312. In various embodiments, the second gear 314 is a bevel gear configured to engage a steering collar 316 that is itself coupled to the strut 304. Positioned between the first gear 312 and the rack 308 is an idler gear 318, which facilitates positioning of the rack 308 at a location higher up the strut 304 and further away from the steering collar 316 than is otherwise possible. Details of the effects of the various radii of the pinion 310 and the idler gear 318 are similar to those described above with reference to FIG. 2 and therefore not repeated here.

Still referring to FIGS. 3A and 3B, in various embodiments, the actuator 302 is a hydraulic actuator configured to translate the rack 308 within a housing 320. The housing 320 provides for a first hydraulic chamber 322 positioned on a left side 324 (or a port side) of the housing 320 a second hydraulic chamber 326 positioned on a right side 328 (or a starboard side) of the housing 320. In operation, the first hydraulic chamber 322 is pressurized with hydraulic fluid, which forces the rack 308 to translate from the left side 324 toward the right side 328. Translation of the rack 308 (e.g., in the translational direction (T)), which has gear teeth configured to engage gear teeth on the idler gear 318, causes the idler gear 318 to rotate in a first direction (e.g., a clockwise direction with respect to an axis perpendicular to an axis A that extends through the strut 304). Rotation of the idler gear 318 in the first direction causes the first gear 312 and the second gear 314 to rotate in a second direction (e.g., a counter-clockwise direction with respect to an axis perpendicular to the axis A that extends through the strut 304). Rotation of the second gear 314, which has gear teeth configured to engage gear teeth on the steering collar 316, causes the steering collar 316 to also rotate in a first direction (e.g., a clockwise direction with respect to the axis A through the strut 304). Rotation of the steering collar 316 in the first direction (e.g., in the rotational direction (R)) causes the strut 304 to likewise rotate in the first direction, thereby enabling the aircraft to turn, for example toward its left or port side. The process is reversed to enable turning the aircraft to the right or starboard side. That is, the first hydraulic chamber 322 is depressurized while the second hydraulic chamber 326 is pressurized with hydraulic fluid, which forces the rack 308 to translate from the right side 328 toward the left side 324, thereby causing the various gear elements described above to rotate in the opposite directions. In various embodiments, a locking mechanism 340, such as, for example, a detent 342, is configured to engage the rack 308 and to lock the rack 308 in place when the rack 308 has translated fully toward either the left side 324 or the right side 328 of the housing 320. In various embodiments, for example, the detent 342 may be a spring loaded or hydraulically driven component configured to engage a slot 344 disposed within the pistons at either side of the rack 308. The locking mechanism 340 may serve, in various embodiments, to prevent movement of the rack 308 while the pinion 310 is not engaged with the gear teeth of the steering collar 316, thereby obviating the need for a precise measurement of the respective locations of the rack 308 and the steering collar 316 via a position sensor, as described above with reference to FIG. 2, in order to properly reengage the pinion 310 and the steering collar 316.

In various embodiments, the housing 320 further includes an integrated manifold 350 that may be disposed on one or both sides of the rack 308. The integrated manifold 350 provides a location to position various hydraulic components—e.g., valves, switches or pressure regulators—that function to control the actuator 302 or, more specifically, the rack 308 within the housing 320. For example, in various embodiments, the integrated manifold 350 includes a first valve 352 and a second valve 354 that are configured to control the supply of hydraulic fluid to the first hydraulic chamber 322 and the second hydraulic chamber 326, respectively.

Figure 4:
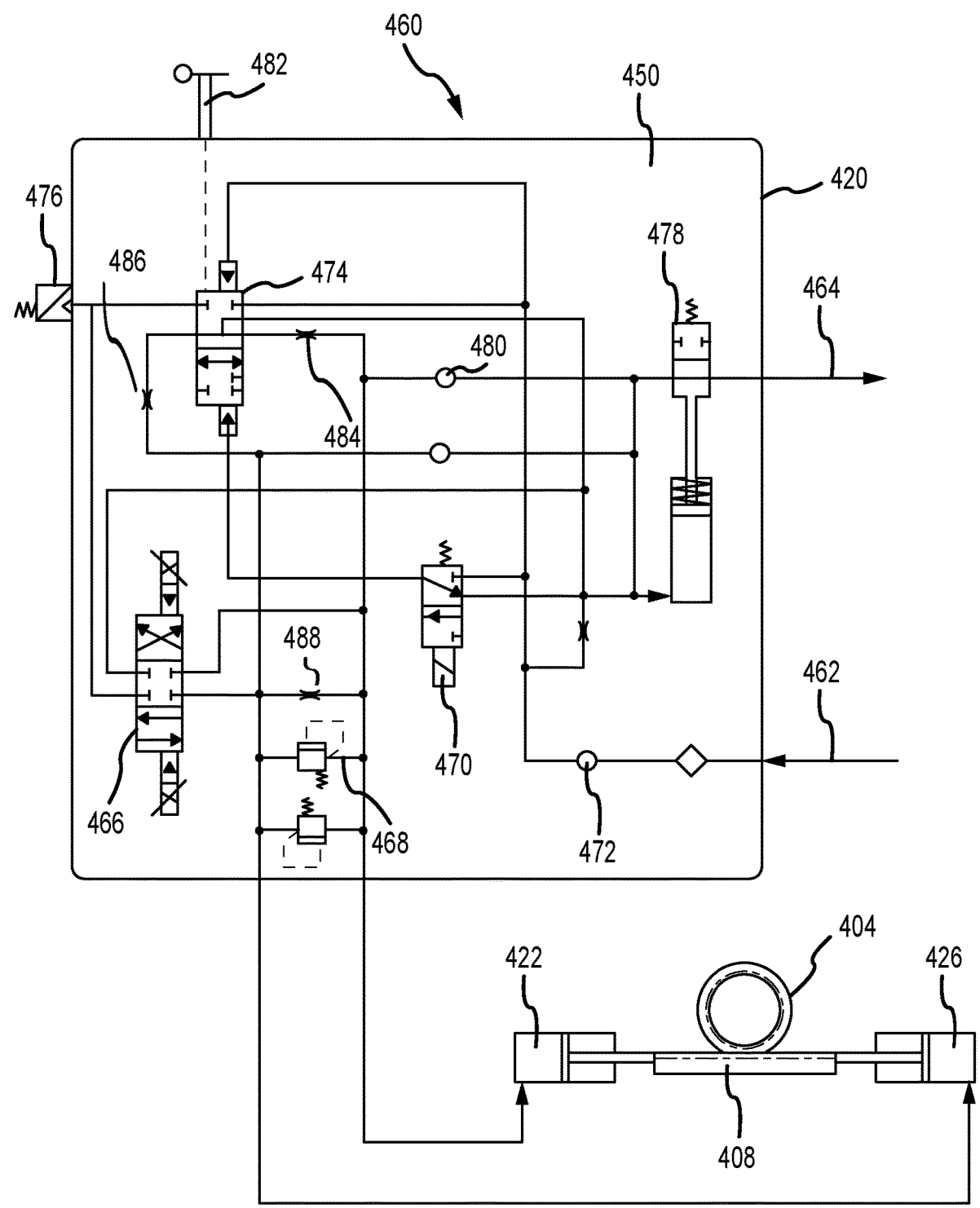
FIG. 4 illustrates a schematic hydraulic system for operating various mechanical components of a nose landing gear system, in accordance with various embodiments.

Referring to FIG. 4, a schematic view of a hydraulic control system 460 disposed within an integrated manifold 450 of a housing 420 is provided, in accordance with various embodiments. The integrated manifold 450 and the housing 420 are similar to the integrated manifold 350 and the housing 320 described above with reference to FIGS. 3A and 3B. In various embodiments, for example, the hydraulic control system 460 is configured to control the flow of hydraulic fluid to a first chamber 422 and to a second chamber 426 (similar to the first hydraulic chamber 322 and the second hydraulic chamber 326 described above) that are configured to rotate a strut 404 via a gear mechanism that couples the strut 404 to a rack 408 as described above. In various embodiments, the hydraulic control system 460 is fluidly coupled to a source 462 of pressurized fluid and to a return 464 of the pressurized fluid to the source 462. In various embodiments, the hydraulic control system 460 may include various components, including, for example, an electrohydraulic servo valve 466, a load relief valve 468, a shut-off valve 470, a check valve 472 a mode selector valve 474, a pressure switch 476, a compensator assembly 478, an anti-cavitation valve 480 and a manual bypass valve 482. The hydraulic control system 460 is also configured for damping that, among other things, may serve to reduce shimmy within the steering system. In various embodiments, for example, the hydraulic control system 460 includes a first power-off orifice 484 and a second power-off orifice 486 that act as damping restrictors when the strut 404 is not being driven by a motor. Similarly, the hydraulic control system 460 may include a power-on orifice 488 that acts as a damping restrictor when the strut 404 is being driven by a motor. As mentioned, the orifices function to damp undesirable shimmy in the steering system that may otherwise occur, either when the strut 404 is being driven by a motor or being driven by an external means with the motor off.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A nose-wheel steering system, comprising:
   an actuator;
   a strut; and
   a gearing mechanism operably coupling the actuator to the strut, the gearing mechanism including a steering collar attached to the strut, an idler gear having idler gear teeth that are engaged with the actuator and a pinion having (i) a first gear having first gear teeth that are engaged with the idler gear teeth of the idler gear and (ii) a second gear coaxial with and attached to the first gear, wherein the second gear has second gear teeth that are engaged with the steering collar,
      wherein the idler gear has a radius that is smaller than a radius of the first gear,
   wherein the steering collar includes a toothed section and a free section disengageable from the gearing mechanism in a first range of motion, wherein the steering collar is free-swiveling relative to the gearing mechanism throughout the first range of motion.

2. The nose-wheel steering system of claim 1, wherein the toothed section extends about a circumference of the strut equal to between ninety degrees and one-hundred twenty degrees.

3. The nose-wheel steering system of claim 1, wherein the free section extends about a circumference of the strut equal to between two-hundred forty degrees and two-hundred seventy degrees.

4. A steering system, comprising:
- an actuator having a housing and a rack slidably disposed within the housing;
- a strut having a steering collar disposed about at least a toothed section of a circumference of the strut; and
- a gearing mechanism operably coupling the rack to the steering collar, the gearing mechanism including an idler gear having idler gear teeth that are engaged with the rack and a pinion having (i) a first gear having first gear teeth engaged with the idler gear teeth of the idler gear and (ii) a second gear having second gear teeth that are engaged with the steering collar;
- wherein the actuator includes a first hydraulic chamber configured to translate the rack in a first direction and a second hydraulic chamber configured to translate the rack in a second direction;
- wherein the first gear has a first gear radius and the second gear has a second gear radius, the second gear radius being at least twice the first gear radius; and
- wherein the steering collar includes the toothed section and a free section and the toothed section extends about the circumference of the strut equal to between ninety degrees and one-hundred twenty degrees and the free section extends about the circumference of the strut equal to between two-hundred forty degrees and two-hundred seventy degrees.

5. The steering system of claim 4, wherein the actuator includes a valve disposed within an integrated manifold that is configured to control a flow of hydraulic fluid to the first hydraulic chamber and to the second hydraulic chamber.

6. The steering system of claim 5, wherein the housing includes a detent configured to lock the rack.

* * * * *